United States Patent [19]

Nakai et al.

[11] 4,345,816
[45] Aug. 24, 1982

[54] OPTICAL FIBER INTRODUCING EQUIPMENT FOR OPTICAL SUBMERGED REPEATER

[75] Inventors: Taiichiro Nakai, Fujisawa; Masanori Sato, Machida; Kahei Furusawa, Kamifukuoka; Hitoshi Yamamoto, Kawasaki; Yoshihiko Yamazaki, Kashiwa; Yoshihiro Ejiri, Tokyo, all of Japan

[73] Assignee: Kokusai Denshin Denwa Kabushiki Kaisha, Tokyo, Japan

[21] Appl. No.: 263,120

[22] Filed: May 13, 1981

Related U.S. Application Data

[63] Continuation of Ser. No. 33,232, Apr. 25, 1979, abandoned.

[30] Foreign Application Priority Data

May 9, 1978 [JP] Japan ................................ 53-54042

[51] Int. Cl.³ .................................................. G02B 7/26
[52] U.S. Cl. ................................ 350/96.20; 174/70 S
[58] Field of Search ............... 350/96.20, 96.23, 96.30; 174/70 S

[56] References Cited

U.S. PATENT DOCUMENTS

| | | | |
|---|---|---|---|
| 2,938,067 | 5/1960 | Werner | 174/70 S |
| 3,082,291 | 3/1963 | Parkinson et al. | 174/70 S X |
| 3,461,539 | 8/1969 | Napple | 350/96.20 X |
| 3,872,233 | 3/1975 | Rocton | 174/70 S X |
| 4,172,212 | 10/1979 | Heinzer | 174/70 S X |
| 4,186,999 | 2/1980 | Harwood et al. | 350/96.20 X |
| 4,196,965 | 4/1980 | Matsuno | 350/96.21 |

FOREIGN PATENT DOCUMENTS 2510618  9/1975  Fed. Rep. of Germany ... 350/96.20

Primary Examiner—John D. Lee
Attorney, Agent, or Firm—Robert E. Burns; Emmanuel J. Lobato; Bruce L. Adams

[57] ABSTRACT

An optical fiber introducing equipment for an optical submerged repeater, in which for introducing an optical fiber for optical communication into an optical submerged repeater housing through an introducing hole, the coating of the portion of the optical fiber to be disposed in the introducing part is entirely removed for a suitable length; the coated optical fiber having the exposed fiber portion is inserted into a small-diametered metal cylinder having an insertion hole which has an inner diameter more than several times as large as the outer diameter of the coated optical fiber; an adhesive whose volume remains substantially unchanged even if hardened is filled between the optical fiber and the insertion hole to unite the optical fiber and the metal cylinder; seawater preventing means is provided on the outside of the adhesive for preventing the adhesive from making direct contact with seawater; and the metal cylinder is disposed in the introducing hole provided at a part of the repeater housing.

9 Claims, 2 Drawing Figures

OPTICAL FIBER INTRODUCING EQUIPMENT FOR OPTICAL SUBMERGED REPEATER

This is a continuation of application Ser. No. 033,232, filed Apr. 25, 1979, now abandoned.

BACKGROUND OF THE INVENTION

1. Field of the Invention

This invention relates to an equipment for introducing an optical fiber into an optical submerged repeater.

2. Description of the Prior Art

An optical fiber employed in optical communication is made of quartz, optical glass, or the like and hence is brittle. In case of being employed for the optical communication, the optical fiber is reinforced by a plastic, metal or like coating. In the introduction of the coated optical fiber into an optical submerged repeater housing at the bottom of the deep sea of 8000 m, sufficient airtightness and hydraulic pressure resistance are required.

SUMMARY OF THE INVENTION

In view of the above, an object of this invention is to provide an optical fiber introducing equipment for an optical submerged repeater having the sufficient airtightness and the hydraulic pressure resistance.

In accordance with this invention, there is provided an optical fiber introducing equipment for an optical submerged repeater, in which a coated optical fiber having a coating removed end is inserted into a small-diametered metal cylinder having an insertion hole of an inner diameter more than several times as large as the outer diameter of the coated optical fiber, and in which an adhesive whose volume does not change even if hardened, for example, an epoxy-system adhesive, is filled in the metal cylinder to unite the optical fiber directly to the metal cylinder to thereby provide airtightness and hydraulic pressure resistance and, in which in order to keep the epoxy-system adhesive from seawater, an uncompressible liquid which is chemically stable and excellent in wettability, for example, vegetable oil, poly-isobutylene or the like, is disposed around the epoxy-system adhesive to prevent its degradation due to adsorption of seawater.

BRIEF DESCRIPTION OF THE DRAWING

The principle and construction of this invention will be clearly understood from the following detailed description taken in conjunction with the accompanying drawings, in which.

DETAILED DESCRIPTION OF PREFERRED EMBODIMENTS

Figure 1:
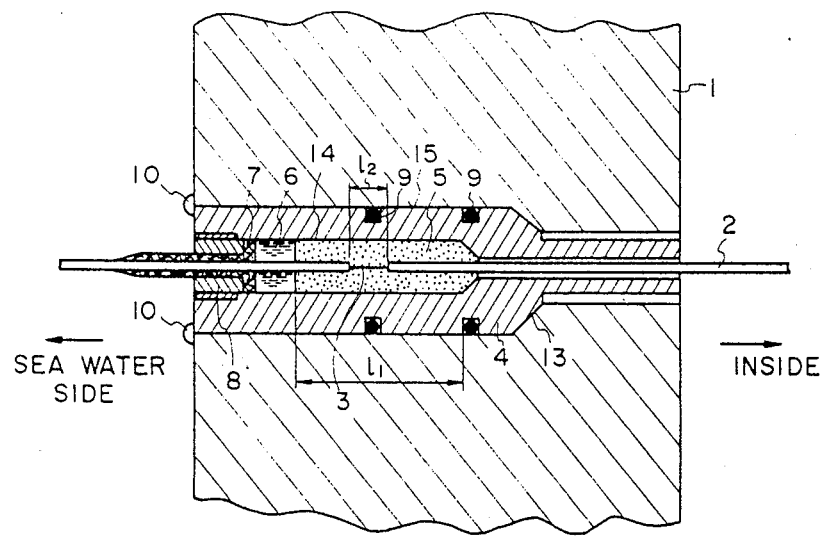
FIGS. 1 and 2 are respectively longitudinal sectional views showing embodiments of optical fiber introducing equipment for an optical submerged repeater according to this invention.

With reference to FIG. 1 showing an embodiment of this invention, reference numeral 1 indicates a cover of an optical submerged repeater housing; 2 designates a coated optical fiber; 3 identifies a portion of an optical fiber exposed by removing a part of the coating of the coated optical fiber; 4 denotes a small-diameter metal cylinder; 5 represents an epoxy-system adhesive; 6 shows an uncompressible liquid which is chemically stable and excellent in wettability, for example, vegetable oil, polyisobutylene or the like; 7 refers to a structure for preventing outflow of the liquid, for instance, rubber or like packing; and 8 indicates a screw or like packing gland for pressing the packing 7. The left-hand side of FIG. 1 is the seawater side and the right-hand side is the inside of the repeater housing. In such a state, a pressure applied from the left-hand side is transmitted via the packing 7 to the liquid 6, but this pressure is blocked by the epoxy-system adhesive 5 ultimately. The outer diameter of the coated optical fiber 2 is about 1 mm and, if the inner diameter of an insertion hole 14 of the small-diameter metal cylinder 4 is selected, for example, to be 5 mm in consideration of actual working and assembling, a thrust load applied at 800 atmospheres is 157 kg. Assuming that a shearing force between the epoxy system adhesive 5 and the metal 4 is about 1.0 kg/mm$^2$, the length ($l_1$ in FIG. 1) of the optical fiber united to the metal part is approximately 10 mm. The reason for which the plastic or like coating of the coated optical fiber 2 is partly removed to provide the exposed portion 3 is that there exists in the plastic or like coating a distortion which increases with the lapse of time due to viscoelasticity of the coating under high hydraulic pressures. Because of this distortion, the plastic or like coating of the optical fiber for reinforcement receives the thrust load by the hydraulic pressure and is displaced toward the inside of the optical repeater housing to apply nonuniform force to the optical fiber, resulting in the optical fiber being broken or seawater entering into the repeater housing. To avoid this, the coating of the coated optical fiber 2 is removed for a suitable length to expose the optical fiber. The length ($l_2$ in FIG. 1) of the exposed optical fiber is about 0.3 mm if its diameter is selected to be 0.15 mm assuming that the thrust over the cross sectional area of the optical fiber is received by the exposed portion. The coated optical fiber 2 having the thus exposed portion 3 is inserted into the insertion hole 14 of the small-diameter metal cylinder 4, and the metal and the optical fiber are directly united together by the epoxy-system adhesive 5, thereby ensuring that the coated optical fiber 2 is introduced into the optical submerged repeater housing. On top of that, since the coating of the coated optical fiber 2 is partly removed, it is perfectly prevented that the coated optical fiber 2 is broken by the viscoelasticity of the plastic and that seawater enters into the optical submerged repeater housing. Further, the inner diameter of the insertion hole 14 of the metal cylinder 4 is small, so that even if the equipment is designed in due consideration of the factor of safety in the adhesion of the epoxy-system adhesive 5, sufficient hydraulic pressure resistance and airtightness can be obtained and, by selecting the length $l_1$ in FIG. 1 to be sufficiently large, the thrust of the epoxy-system adhesive 5 owing to a high hydraulic pressure and a movement of the adhesive due to its viscoelasticity can be made completely negligible.

Moreover, in a case of an optical submerged repeater being required to be very highly reliable and stable in performance for a long period of time, there is the possibility that the performance is deteriorated by the seawater absorption of the epoxy-system adhesive. To avoid this, an uncompressible liquid 6 which is chemically stable and excellent in wettability, for instance, vegetable oil, polyisobutylene or the like, is disposed on the exposed surface of the epoxy-system adhesive 5, by which seawater is prevented from making direct contact with the epoxy-system adhesive 5, thus easily achieving stable performance for a long period of time. The packing 7 is required only to prevent the liquid 6, such as vegetable oil, polyisobutylene or the like, from flowing out and to transmit the hydraulic pressure to the liquid 6; therefore, the packing can easily be designed. This introducing equipment is inserted into an introducing hole 15 of the cover 1 of the optical submerged repeater housing to abut against a tapered portion 13 and given the thrust load by the hydraulic pressure. Further, sufficient airtightness can be obtained with an O ring 9 but a complete airtight structure can also be easily achieved by welding on the circumference of the metal cylinder, as indicated by 10.

Figure 2:
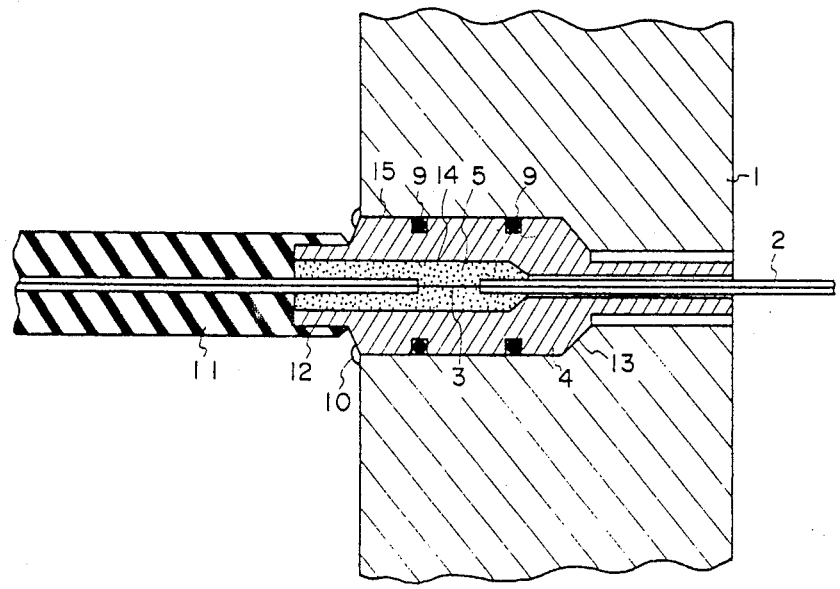

In a case where the optical fiber is protected by a polyethylene or like coating, as shown in FIG. 2, the parts 6, 7 and 8 used in FIG. 1 are not needed and, by directly jointing the polyethylene coating by molding to the metal cylinder at a portion 12, it is possible to obtain the structure in which seawater does not make contact with the epoxy-system adhesive 5. In FIG. 2, reference numeral 1 indicates a cover of an optical submerged repeater housing; 2 designates a coated optical fiber; 3 identifies a portion of an optical fiber exposed by removing a part of the coating of the coated optical fiber; 4 denotes a small-diametered metal cylinder; 5 represents an epoxy-system adhesive; 9 shows an O ring; 10 refers to a welded portion; 11 indicates the coating of the coated optical fiber; 12 designates a mold portion; 13 identifies an abutting portion; 14 denotes an insertion hole; and 15 represents an introducing hole.

As has been described in the foregoing, the structure of this invention is relatively small in diameter, so that many coated optical fibers can efficiently be passed through the cover of the optical repeater housing. Further, since the coated optical fiber is very thin, a plurality of fibers can also be inserted into one insertion hole. Also in a case of the coated optical fiber being enclosed in a pressure resisting layer, it can be introduced by the same method into the optical repeater housing.

What we claim is:

1. An optical fiber introducing equipment for an optical submerged repeater comprising:
  a small-diametered metal cylinder having an outer diameter and an insertion hole provided along the axis thereof, said outer diameter matching dimension with an introducing hole provided from the seawater side to the inside of a part of said optical submerged repeater, said insertion hole having an inner diameter more than several times as large as the outer diameter of a coated optical fiber to be introduced into the repeater, the coating of a portion of the coated optical fiber to be disposed in the introducing hole for being introduced into the repeater being entirely removed for a suitable length that is sufficiently less than the length of the insertion hole, and said coated optical fiber including said portion being inserted in said insertion hole, said metal cylinder seated in said introducing hole under sufficient airtightness;
  an adhesive having a substantially unchanged volume when hardened, said adhesive filling a space between said inserted, coated optical fiber and said insertion hole to unite said small-diametered metal cylinder and said coated optical fiber including said portion; and
  seawater contact preventing means provided at the outside of said adhesive for preventing said adhesive from making direct contact with seawater.

2. An optical fiber introducing equipment according to claim 1, in which said seawater contact preventing means comprises a liquid chemically stable, excellent in wettability and low in compressibility and disposed at the outside of the exposed surface of said adhesive.

3. An optical fiber introducing equipment according to claim 1, in which said seawater contact preventing means comprises a material of the coating of said coated optical fiber joined to the metal cylinder at the seawater side.

4. In combination, a small-diametered elongated metal cylinder for introducing an optical fiber into the housing of a submarine repeater, the metal cylinder having an axial bore for receiving an optical fiber and an outer diameter dimensioned to fit in a watertight manner into an elongated opening in a housing for the submarine repeater open to the exterior of the housing, a coated optical fiber extending axially through said axial bore and out thereof at both ends of the metal cylinder, the axial bore having a portion thereof with an enlarged diameter several times larger than the outer diameter of the coated optical fiber and open at an end of the metal cylinder disposed in said elongated opening toward the exterior of the housing of the submarine repeater, the optical fiber having an uncoated portion disposed in said axial bore portion with an enlarged diameter and of less length than an axial length of said axial bore portion, an adhesive having a substantially fixed volume when hardened disposed in said portion of the axial bore filling the space between the optical fiber and the bore portion of enlarged diameter and covering the uncoated portion of the fiber, the adhesive terminating axially spaced from said end of the cylinder, a chemically stable liquid having excellent wetting ability and low in compressibility in said portion of the axial bore in contact with an end of the adhesive toward said end of the metal cylinder and filling a length of said portion of the axial bore, a packing holding the liquid in said bore portion, a packing gland holding said packing in position and disposed to preclude water entering the bore portion when the metal cylinder is disposed in a submarine repeater which is submerged, and the optical fiber extending through the packing and packing gland.

5. The combination according to claim 4, including the housing of said repeater having said elongated opening.

6. In combination, a small diametered elongated metal cylinder for introducing an optical fiber into the housing of a submarine repeater, the metal cylinder having an axial bore for receiving an optical fiber and outer diameter dimensioned to fit in a watertight manner into an elongated opening in a housing of the submarine repeater open to the exterior of the housing, a coated optical fiber extending axially through said axial bore out thereof at both ends of the metal cylinder, the axial bore having a portion thereof with an enlarged diameter several times larger than the outer diameter of the coated optical fiber and opening at an end of the metal cylinder disposed in the elongated opening toward the exterior of the housing of the submarine repeater, the optical fiber having an uncoated portion disposed in said axial bore portion with an enlarged diameter and of less length than an axial length of said axial bore portion, an adhesive having a substantially fixed volume when hardened disposed in said portion of the axial bore filing a space between the optical fiber and the bore portion of enlarged diameter and covering the optical fiber including the uncoated portion of the fiber, the adhesive terminating axially spaced from said end of the metal cylinder, and a watertight seal about the optical fiber to preclude water contacting the adhesive or entering the axial bore portion of enlarged diameter.

7. The combination according to claim 6, in which said metal cylinder has an axial projection of reduced diameter at said end thereof and into which said portion of enlarged diameter of the axial bore extends with said adhesive therein, and in which said seal comprises a molded coating on the optical fiber molded onto the axial projection circumferentially thereof and axially thereon.

8. The combination according to claim 7, in which said coating is polyethylene.

9. The combination according to claim 6, in which said seal comprises a chemically stable liquid having excellent wetting ability and low in compressibility in contact with an end of the adhesive toward said end of the metal cylinder and filling a length of said portion of the axial bore, a packing holding the liquid in said portion of the bore, and a packing gland holding said packing in position.

* * * * *